July 19, 1960    R. H. COLLEY    2,945,347
FUEL CONTROL

Filed Dec. 5, 1956    3 Sheets-Sheet 1

Inventor
Rowan Herbert Colley
by
Buch and Radue
Attorneys

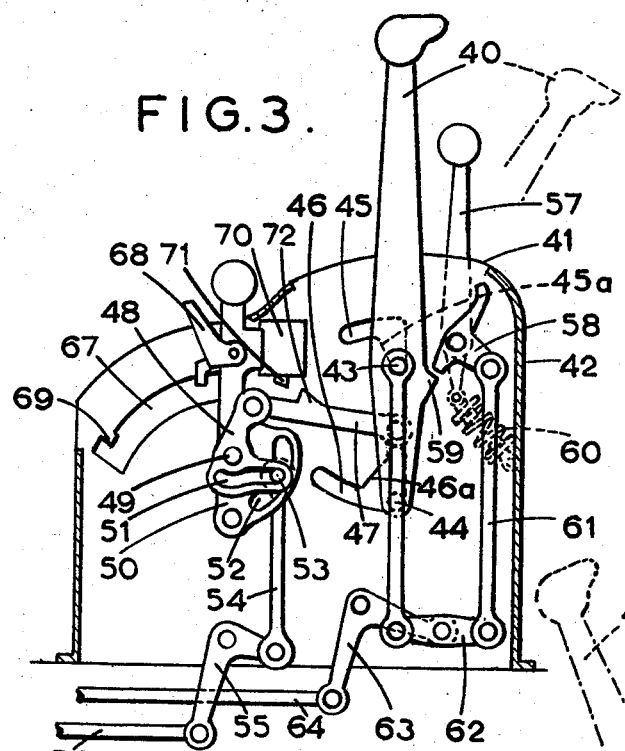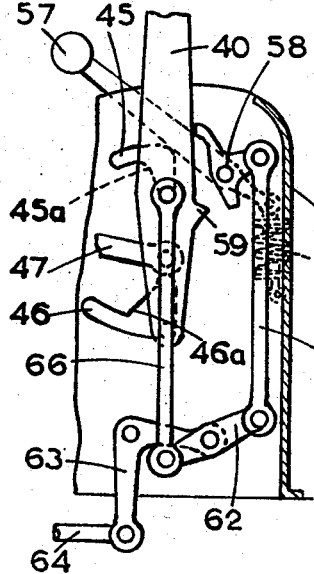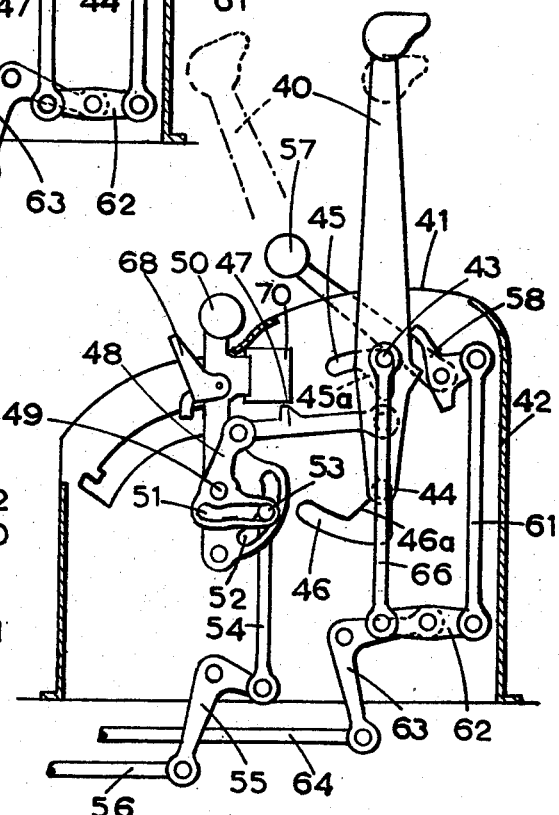

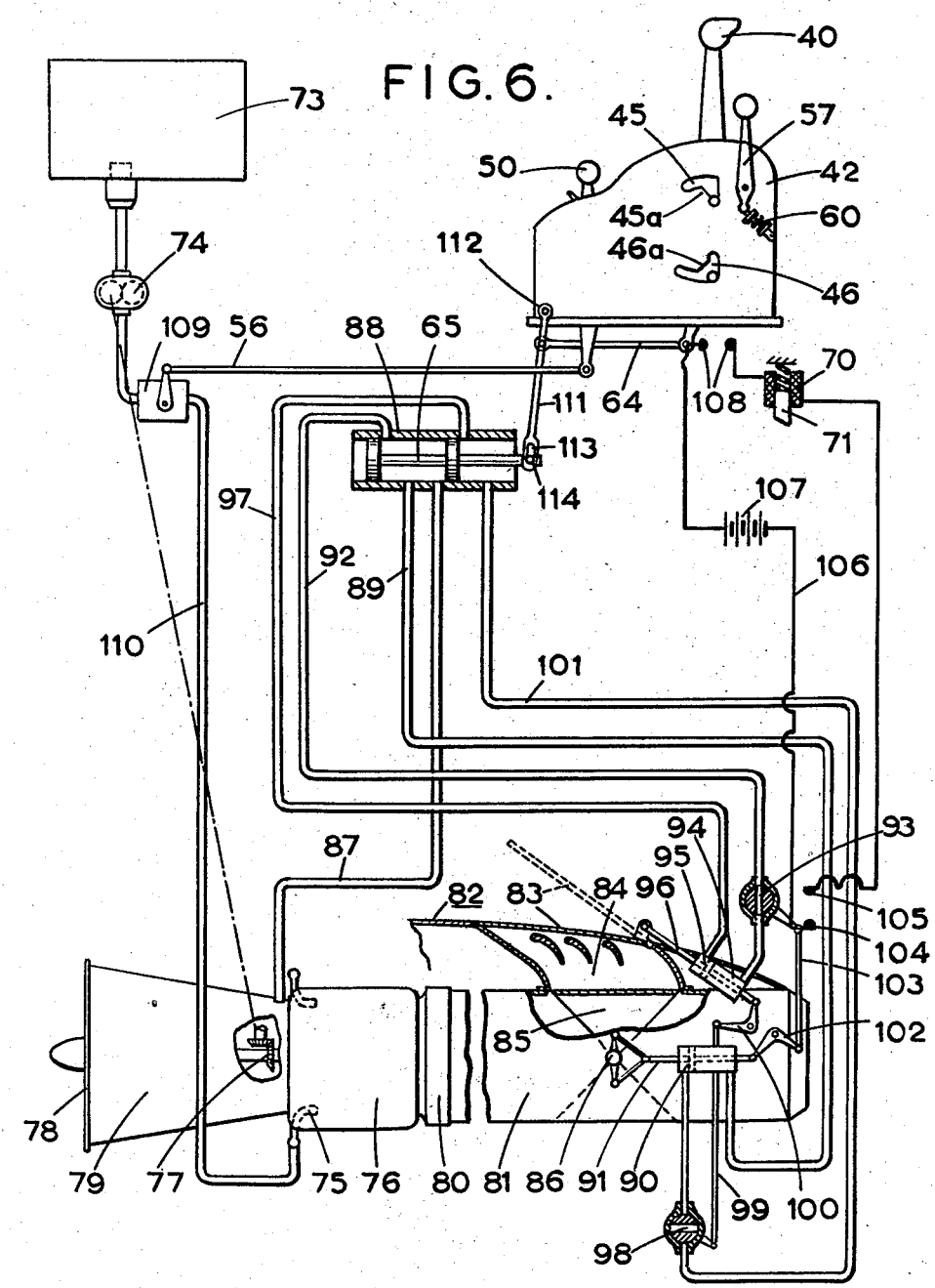

United States Patent Office 2,945,347
Patented July 19, 1960

2,945,347

FUEL CONTROL

Rowan Herbert Colley, Sunnyhill, Derby, England, assignor to Rolls-Royce Limited, Derby, England, a British company Filed Dec. 5, 1956, Ser. No. 626,439

Claims priority, application Great Britain Dec. 13, 1955

11 Claims. (Cl. 60—35.54)

On an aircraft it is normal practice to have a throttle control which is moved forward to increase the fuel supply to the engine and thus increase the propulsive thrust acting on the aircraft, and conversely rearwardly to reduce the fuel supply and thus reduce the propulsive thrust. With an aircraft which is driven by jet reaction and is provided with means for reversing the direction of the propulsive jet to act as a brake, for example after landing, when such thrust reversing means are in operation the fuel supply is required to be increased to increase the braking force to reduce the speed of the aircraft and to be reduced to reduce the braking force. The natural instinct of the pilot however is still to move the lever forward to increase speed and backward to reduce it.

According to this invention there is provided a fuel control lever moving over a quadrant to control the flow of fuel to an engine of the jet reaction type and also to move in another direction between two positions from each of which it can perform movement over a portion of said quadrant and in which after being moved to the first position forward movement of the lever away from said first position increases the supply of fuel to the engine and a backward movement towards said first position decreases it and after being moved into the second position backward movement of the lever away from said second position increases the supply of fuel and forward movement towards said second position decreases it.

In a first preferred construction there are two portions of the quadrant over which the lever moves with a gate between them and the lever can move in a sideways direction through the gate from one position to the other to pass from one portion of the quadrant to the other.

In a second preferred construction it is arranged that the control lever is moved up or down to pass from one position to the other.

In arrangements according to this invention movement of the control lever from one position to the other changes the location of the end of a member transmitting control lever movement to the fuel control valve from one side of the control lever pivot to the other thereby to reverse fuel control valve movement relative to control lever movement.

Thus in the first preferred construction mentioned above there may be provided on either side of the control lever a lever pivoted co-axially therewith and forked such that sideways movement of the control lever through the gate disengages it from one forked lever and engages it with the other, a member transmitting control lever movement to the fuel control means being pivoted to one of said forked levers on one side of the pivot axis and another member transmitting control lever movement to the fuel control valve being pivoted to an extension of the other forked lever on the other side of the pivot axis.

Likewise in the second preferred construction referred to above the control lever may be provided with vertically-spaced pivots, the control lever swinging about one pivot when operating from said first position and about the other pivot when operating from said second position, and a member transmitting control lever movement to the throttle valve is pivoted to said control lever between the vertically-spaced pivots.

In a modification of the second construction stationary vertically-spaced pivots are provided and the control lever is provided with vertical slots, one co-operating with each pivot.

The invention may be used with an arrangement in which the outlets for the reversed propulsive jet are provided with doors forming part of the surface of the engine nacelle, the doors being closed except when the reverse thrust mechanism is in operation, and in which the reverse thrust mechanism includes valve means in the jet pipe of the engine and operative to reverse the thrust.

In arrangements according to this invention, a stop prevents movement of the control lever along the reverse thrust portion of the quadrant thereby to increase the thrust, until the said valve has been operated to reverse the propulsive jet.

The stop may be removed by operation of a solenoid in a circuit which is made by the closing of a switch closed when the said valve has been operated.

In the first preferred construction the said nacelle doors are held closed by the energisation of solenoids controlled by an electrical circuit in which are two switches in parallel. One of these switches is opened when the aircraft undercarriage is lowered and the other when the control lever has been moved back to the idling position when on the normal thrust side of the gate.

The nacelle doors will be closed therefore unless both the undercarriage has been lowered and the control lever is not in a position on the normal thrust side of the gate in advance of the idling position.

In this construction movement of the control lever through the gate from the normal flight to the reverse thrust part of the quadrant closes a switch in an electrical circuit to bring the thrust-reversing mechanism into operation and in this circuit there are a number of further switches in series each operated by one of the said nacelle doors so that the said thrust-reversing mechanism cannot be operated unless each of the said nacelle doors has been opened and has thereby caused the closing of its associated switch.

In the second preferred construction a stop member is provided inhibiting movement of the control lever to the reverse thrust position, this stop member being carried on a lever operated by the pilot when reverse thrust is desired. It is arranged that operation of this lever to permit lifting of the control lever to select reverse thrust also operates to open the doors in the engine nacelle. In this construction also it is arranged that the thrust reversal valve cannot be moved to the reverse thrust position until the doors have been opened.

Examples of this invention are illustrated in the accompanying drawings, of which:

Figures 3, 4 and 5 are sections through a casing containing a different arrangement of fuel control levers and Figure 6 is a diagram of the fuel supply and gate reversing mechanism.

Figure 1:
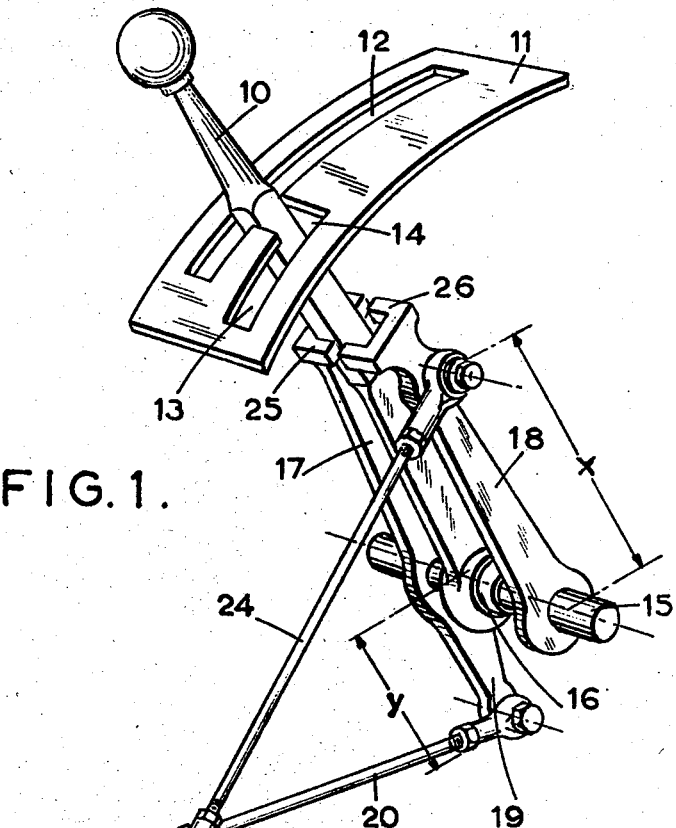
Figure 1 is a perspective view of the fuel control lever, quadrant and part of the linkage connecting the lever to the fuel control mechanism.

The fuel control lever 10 moves over a quadrant 11 which contains two slots 12 and 13 with a gate 14 between them.

The lower end of the lever 10 is pivoted to a shaft 15 by a ball-and-socket joint 16 which allows the lever to be rocked on the joint in a direction axially of the shaft as well as to move rotationally about the shaft. Freely mounted for rotation on the shaft are two levers 17 and 18. Lever 17 has an extension 19 below shaft 15 and this extension is connected by a rod 20 to a lever 21 fulcrummed at 22 on a fixed part and in turn connected through a rod 23 to the fuel control mechanism.

Lever 18 is connected, above the shaft 15, by a rod 24 to lever 21.

The levers 17 and 18 terminate at the top in U-shaped or slotted pieces 25 and 26 which, when the parts are in the position shown, face each other. Each of these U-shaped pieces is adapted to receive a correspondingly-shaped part of the lever 10 so that levers 17 and 18 are moved forward or back by the lever 10 when the latter is resting inside the U piece 25 or 26 as the case may be.

Figure 2:
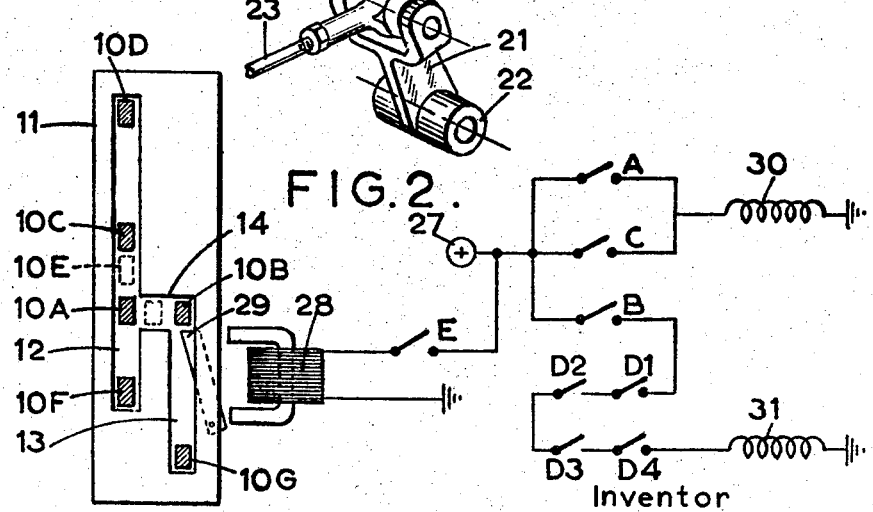
Figure 2 is a wiring diagram showing the quadrant in plan and the fuel control lever in section in various positions in the quadrant.

In Figure 2 the quadrant 11 is shown in a developed plan with lever 10 shown in section in various positions 10A, 10B, 10C, 10D, 10E, 10F, 10G.

With the lever 10 there are associated three electrical circuits which operate protective devices. Each circuit operates from a source of electrical energy shown at 27 back to earth which is conventionally shown.

The first circuit is through a solenoid 28 which controls a stop member 29 which impedes movement of lever 10 in slot 13, until the solenoid is energised, when it pulls the stop member 29 away and leaves slot 13 unobstructed. This circuit is made by closing a switch E which is only closed when the jet pipe valve, by means of which the jet associated with throttle 10 is reversed in the braking condition, is fully open.

The second circuit includes a solenoid 30 which operates to close the said nacelle doors. In this circuit there are two switches A and C in parallel. Switch A is closed whenever lever 10 is in slot 12 in any position between that shown at 10E which is just in advance of the idling position and 10D which corresponds to full throttle. Switch C is closed when the aircraft undercarriage is fully retracted.

The third circuit includes a solenoid 31 which operates the valve mechanism in the jet pipe by which the normal outflow from the engine jet pipes is closed and the jets directed with a forward component through the outlets normally closed by said nacelle doors, to provide a reverse thrust. In this circuit there are five switches; switch B which is closed by the rocking of the throttle lever 10 through the gate 14 from position 10A to position 10B and of course opened by the reverse movement; and four switches D1, D2, D3 and D4 in series with switch B, which are closed each by one of the said nacelle doors when that door has reached the fully open position.

The way the control works is as follows:

For normal flight the pilot moves lever 10 in the slot 12 of the quadrant 11. In the position shown in Figure 1 at 10A (Figure 2) the lever is in the idling position with the normal rearward discharge from the jet pipes. Movement forward from this position along slot 12 opens up the throttle through the minimum cruise position 10C to full throttle 10D. Backward movement from position 10A to position 10F shuts off the engine. During this movement lever 10 engages the U-shaped or slotted piece 25 on lever 17 and the movement of the throttle valve is effected through lever 17, its extension 19 and rod 20.

While the lever 10 is in slot 12 in any position between 10E and 10D switch A will be closed and the thrust reverse nacelle doors will be closed, that is to say for example during take-off these nacelle doors will be closed.

When the pilot comes in to land he will lower his undercarriage which opens switch C and move his lever 10 backward until it reaches the position 10A, which is also shown in Figure 1. This movement of the throttle lever opens switch A. The opening of these two switches C and A breaks the circuit to solenoid 30 and the nacelle doors open. The pilot then moves lever 10 through the gate 14. Owing to the geometry of rods 20 and 24, levers 17 and 18 will then be in the position shown in Figure 1 and the lever can then disengage from slotted piece 25 and engage slotted piece 26 and thereafter control the throttle through lever 18 and rod 24.

Movement through the gate closes switch B. As the nacelle doors have opened, switches D1, D2, D3 and D4 will be closed. Solenoid 31 is therefore energized and accordingly the reverse thrust mechanism is brought into operation. When the jet pipe valve associated with the engine controlled by this throttle lever 10 has fully opened to receive the thrust, switch E is closed, solenoid 28 is energized, and the lever 10 is therefore free to move rearwards in slot 13 and to open up the throttle. As will be appreciated the connection of rods 20, 24 respectively to extension 19 of lever 17 and to lever 18 at points on opposite sides of the shaft 15 about which they pivot results in a reversal of the motion of rod 23 for a given sense of movement of control lever 10. This opening up of the fuel supply by movement of lever 10 in slot 13 is at a greater rate than it is when the lever is moving forward in slot 12, due to the effective length of this lever shown at X in Figure 1 being approximately twice that of the extension 19 of lever 17 shown at Y in Figure 1.

It will be noted that should any solenoid fail it will fail safe. If solenoid 30 fails the nacelle doors will be open. If solenoid 28 fails the stop 29 will be in operation. If solenoid 31 fails the reverse thrust cannot be brought into operation.

In the example shown in Figures 3, 4, 5 and 6 the control lever 40 is adapted to be moved forward and back over a quadrant opening 41 in a casing 42, the lever being fulcrummed at two points 43 and 44 on pins which fit into slots 45 and 46 in the side wall of the casing. Intermediate these two pivots the lever is connected by a link 47 to a bell crank lever 48 articulated at 49 on the casing 42 the bell crank lever 48 having a slot 51 and lever 50 having a slot 52. A pin 53 on the end of a link 54 fits through both these slots and the link is articulated to a bell crank lever 55 which is connected to a rod 56 by which the fuel control valve is opened or shut.

In Figure 3 the lever 40 is shown in the idling position for forward thrust. In that position it can be moved forward and back over the quadrant, the lever turning on pivot 43 and pin 44 sliding in the rearwardly-extending portion of the slot 46. It is in this way that the fuel valve is controlled during normal flight.

For control when reverse thrust is operative lever 40 is raised from the position shown in Figure 3 to that shown in Figure 5 when pin 44 will be raised to the top of slot 46 and pin 43 will be able to move in slot 45. It will be noticed that pin 44 on which the lever turns lies on the other side of link 47 to the pin 43 which formed the fulcrum for forward thrust. Movement forward of the lever will now operate to reduce the fuel supply and rearward movement to increase the fuel supply. Again because of different distances between the pivot for link 47 and the two lever pivot pins 43 and 44, fuel supply is at a greater rate per unit of lever movement for control of rearward propulsion than for control of forward movement of the craft.

Before lever 40 can be raised it is necessary to operate lever 57 hereinafter called the "intent lever" which carries a stop member 58 pivoted at the bottom of the lever and co-operating with a shoulder 59 on control lever 40.

Before being able to lift lever 40 therefore to give the reversed thrust position the pilot must move lever 57 to the position shown in Figures 4 and 5.

A spring toggle device 60 ensures that lever 57 will not stop between the positions shown in Figures 3 and 4.

Movement of lever 57 operates also through link 61 and link 62 to raise bell crank lever 63 fulcrummed on casing 42 and connected by a link 64 to a valve member 65 (see Figure 6).

When the lever 57 has been displaced lever 40 can be raised and this as well as bringing slot 45 into operation raises, through a link 66, the other end of lever 62 and displaces bell crank lever 63 and rod 64. Lever 50, which operates the shut-off cock of the engine, moves over a quadrant 67. It can be locked by a locking device 68 in the position shown in Figures 3 and 5 when the fuel control functions as before described and in another position in which locking member 68 is in slot 69 in which the fuel control lever cannot move the rod 56. This corresponds to the shut-off position of the engine.

Lever 50 also carries a solenoid 70 which operates a stop member 71 which co-operates with a catch 72 on link 47.

When pivot 43 is in the reverse-thrust slot 45 the lever 40 cannot be moved backwards to increase the fuel supply until solenoid 70 has removed stop 71 out of the pathway of catch 72.

A diagrammatical lay out of the fuel control and reversing mechanism is shown in Figure 6. In this figure the position of control lever 40 and intent lever 57 is the same as in Figure 3.

Fuel is delivered from a fuel tank 73 via a pump 74 to the burners 75 in the combustion equipment 76 of the engine. Pump 74 is driven by the engine through gear wheels 77. Air enters the engine via the intake 78 and compressor 79 and after passing through the combustion equipment 76 and turbine 80 is discharged through jet pipe 81 to provide propulsive thrust.

The nacelle 82 around the engine has two doors, one of which is shown at 83, with a passage way 84 leading thereto from the jet pipe, and the inner end of the passage way is adapted to be opened by valve 85 which can be swung about a pivot 86 to close the jet pipe and discharge the effluent out through the passageway 84 and open door 83. The opening of the door and the operation of the thrust reversal valve are brought about in the following manner.

A pipe 87 leads from the delivery end of the compressor 79 to a valve chamber 88 in which operates a double piston valve 65. In the position in which the valve is shown in the figure compressed air enters the valve chamber 88 via pipe 87 and passes down pipe 89 to urge ram piston 90 to the left and the jet reversing valve to the position to open the jet pipe.

Air also passes through pipe 92 and valve 93 to ram 94 to urge ram piston 95 to the left and hold via link 96 door 83 closed. Movement of intent lever 57 backward to the position shown in Figure 4 displaces valve member 65 to the right to open pipe 92 to atmosphere and to admit pressure air from pipe 87 to pipe 97 which communicates with ram 94 on the left hand side of piston 96 thus causing the ram piston to be displaced to the right to open door 83. It also causes the opening of valve 98 via a link 99 and lever 100 to put the left hand end of ram piston 90 into communication with the interior of the valve chamber 88 via a pipe 101. Further displacement to the right of piston valve 65 due to the lifting of control lever 40 puts pipe 89 into communication with atmosphere and puts pipe 101 into communication with the space between the pistons of valve 65 and allows compressed air to be applied to the left hand side of piston 90 to move the valve 85 to open the passageway 84 and close off the jet pipe, that is to move the valve to the thrust reversing position. Displacement of piston 90 to the right also closes valve 93 through bell crank lever 102 and link 103 and also closes two contacts 104 and 105 in an electrical circuit 106 through which current is communicated from a source of electricity 107 to the solenoid 70 which controls the stop member 71 to withdraw it.

Another pair of contacts 108 are closed by the raising of the control lever 40.

It will thus be seen that the thrust reversal valve cannot be opened until the thrust reversing doors are opened and that the throttle lever cannot be moved to increase the thrust when in the reversing position until both these operations have taken place.

Throttle valve 109 in the pipe 110 which supplies fuel from pump 74 to the burners 75 is operated through link 56 as described above.

Link 64 which is operated through bell crank lever 63 is connected to the right hand end of valve member 65 by a mechanism such as an arm 111 fulcrummed on the casing 42 at 112 and having a slot 113 at its end which engages a pin 114 on the valve member 65.

It will be appreciated that instead of the pins 43 and 44 being carried by the lever 40 and the slots 45 and 46 being provided in the casing 42 the pins might be fixed to the casing to co-operate with suitable slots in the lever.

In this case the pivots might be rods passing from side to side of the casing and running through a number of levers mounted side by side, each lever being adapted to control an engine of a multi-engined aircraft.

It will be appreciated that if the vertical portions of the slots 45 and 46 are parallel-sided it will be possible to lift or depress lever 40 to move respectively from the forward thrust position to the reverse thrust position and vice versa only when the lever 40 is vertical, that is, at the idling position. Due to the delay in initial acceleration of the engine from idling it may be desired to operate the reverser at an engine speed above idling, for example, by allowing the control lever to be lifted or depressed before it reaches the idling position. This may be arranged quite simply by cutting away the corners of the slots 45 and 46 as at 45a and 46a. With this arrangement the lever 40 may be made to pass rapidly through the vertical position during the lifting or depressing movement so that the engine will not slow down to idling speed and the control lever will be in a position selecting a thrust above idling when the reverser valve completes its travel.

I claim:

1. A fuel control for an aircraft jet-propulsion engine having a fuel control valve and means for reversing the direction of thrust of the engine comprising, in combination, fuel control lever means, pivot point means for said lever means, means adapted to transmit control lever movement to said fuel control valve, quadrant means comprising two quadrant portions over which said lever is selectively movable in arcuate paths by the pilot to control fuel flow to the engine, means intermediate the quadrant means to guide movement of the lever in a path different from that of movement in either of the quadrants for guidance there by one quadrant portion on the other, said pivot point means and said means adapted to transmit control lever movement to said fuel control valve being constructed and arranged such that movement of the lever in said different path changes the relative locations, with respect to the end of the control lever gripped by the pilot, of said pivot point means and the connection of the lever to the mains transmitting control lever movement, whereby movement of the lever in either quadrant portion away from said path increases fuel flow and reverse movement decreases it.

2. A fuel control valve for a jet reaction aircraft engine, in combination, an engine, a source of fuel, and a fuel valve regulating the flow of fuel to the engine, a fuel control lever for manual operation of said fuel valve, a pair of pivot means spaced apart along said lever, a casing having a quadrant opening having edges guiding said lever for fore and aft movement and means for selective interengagement with said pivot means, link means articulated to said lever between the pivot means and to said valve for operating the latter, guide means operatively associated with said lever and said casing constraining the lever for movement in the direction of the lever length to select cooperating pivot means and interengaging means, said interengaging means and pivots being arranged to limit the range of movement of the lever to separate portions of the quadrant for each operative combination of pivot and interengaging means cooperation, whereby forward movement of the lever from one of said pivot positions increases the supply of fuel to the engine and backward movement from the other increases the supply of fuel.

3. A fuel control as claimed in claim 2 in which said interengaging means are slots in said casing and in which the lever can turn selectively on either one of two pivot pins thereon, each in one of said slots, each of which comprises a vertical portion, said portions being spaced one above the other, each slot further comprising an arcuate portion, the arrangement being such that when the lever is in one position it will turn on the lower pin, the upper pin moving through the arcuate portion of the upper slot, and when in the other position it will turn on said upper pin, the lower pin moving through the arcuate portion of the lower slot.

4. A fuel control as claimed in claim 3 in which said slots are so arranged that the movement between the two positions can be made only when the lever is substantially in a position to supply fuel which gives an idling thrust to the engine.

5. A fuel control as claimed in claim 4 in which said slots have curved edges permitting movement of the control lever from one control position to the other to be commenced and compelled with the lever selecting a thrust somewhat greater than idling.

6. A fuel control system as claimed in claim 2 in which said engine controlled by the lever is provided with a nacelle and with a jet pipe, valve means in said jet pipe to reverse the propulsive jet, thus the thrust produced by the engine and doors in the engine nacelle which open to discharge the reversed jet forward, means to operate said valve, means to open said doors, and means preventing the valve being operated to give reverse thrust before said doors have been opened comprising initiating mechanism for said valve reversing operation actuated by the opening of said doors, and means dependent on the position of said fuel control lever and actuated thereby to initiate said door opening.

7. A fuel control as claimed in claim 2 in which there is pivoted on the casing a second lever, a member on said second lever positioned for inhibiting movement of the control lever from the forward thrust position to the reverse thrust position, operation of said lever moving said member and permitting said movement of the control lever.

8. A fuel control as claimed in claim 6 in which operation of said fuel control lever to reverse position operates a servo valve connected to control the transmission of power to operate the reverse thrust doors to cause the same to open.

9. A fuel control system as claimed in claim 8 in which the movement of the control lever to the reverse thrust position causes operation of a servo valve connected to cause movement of the valve in the jet pipe to give reverse thrust.

10. A fuel control system as claimed in claim 8 in which the connection to the said servo valve from said levers is mechanical.

11. A fuel control system as claimed in claim 6 in which a stop member is provided which is positioned to prevent movement of the control lever substantially beyond the position in which the engine idles when that lever is in the reverse thrust position and solenoid means to remove the stop, an electrical circuit which is closed to operate the solenoid, and contacts positioned to be closed only when the valve in the jet pipe which causes reversal of the thrust has been fully operated.

References Cited in the file of this patent

UNITED STATES PATENTS

| | | |
|---|---|---|
| 2,179,492 | Caldwell et al. | Nov. 14, 1939 |
| 2,446,700 | Giles et al. | Aug. 10, 1948 |
| 2,500,811 | Forsyth | Mar. 14, 1950 |
| 2,510,506 | Lindhagen et al. | June 6, 1950 |
| 2,540,427 | Charles et al. | Feb. 6, 1951 |
| 2,664,166 | Swaab | Dec. 29, 1953 |
| 2,849,861 | Gardiner et al. | Sept. 2, 1958 |

FOREIGN PATENTS

| | | |
|---|---|---|
| 638,063 | Great Britain | May 31, 1950 |
| 649,671 | Great Britain | Jan. 31, 1951 |